United States Patent [19]

Carbone

[11] Patent Number: 4,620,716
[45] Date of Patent: Nov. 4, 1986

[54] BOAT GUIDE ROLLER ASSEMBLY

[76] Inventor: Luigi Carbone, 938-942 Port Road, Woodville West, Australia

[21] Appl. No.: 708,246

[22] Filed: Mar. 5, 1985

[30] Foreign Application Priority Data

Mar. 5, 1984 [AU] Australia .................. PG3913

[51] Int. Cl.⁴ .............................. B60P 3/10
[52] U.S. Cl. ................. 280/414.1; 193/35 C; 414/534
[58] Field of Search ............... 414/529, 532, 533, 534; 193/35 B, 35 C; 280/414.1

[56] References Cited

U.S. PATENT DOCUMENTS

| | | |
|---|---|---|
| 3,756,439 | 9/1973 | Johnson ........................... 414/534 |
| 3,917,087 | 11/1975 | Godbersen ........................ 414/534 |
| 4,448,438 | 5/1984 | DeWalk ........................ 414/534 X |

FOREIGN PATENT DOCUMENTS 2707551 8/1978 Fed. Rep. of Germany .... 193/35 C

Primary Examiner—Leslie J. Paperner
Assistant Examiner—Ken Muncy
Attorney, Agent, or Firm—Brown, Martin, Haller & Meador

[57] ABSTRACT

A boat trailer having a pair of spaced guide roller assemblies between which the bow of a boat is located upon boat retrieval. Each guide roller assembly comprises a base member secured to the trailer chassis, a post which can pivot in a generally fore-and-aft direction, a spring which urges the post to an upstanding position, a rocker arm which can pivot in a general transverse direction on the upper end of the post, and a pair of rollers which engage the boat undersurface and help to centralize it as the boat is retrieved from the water and onto the trailer.

6 Claims, 4 Drawing Figures

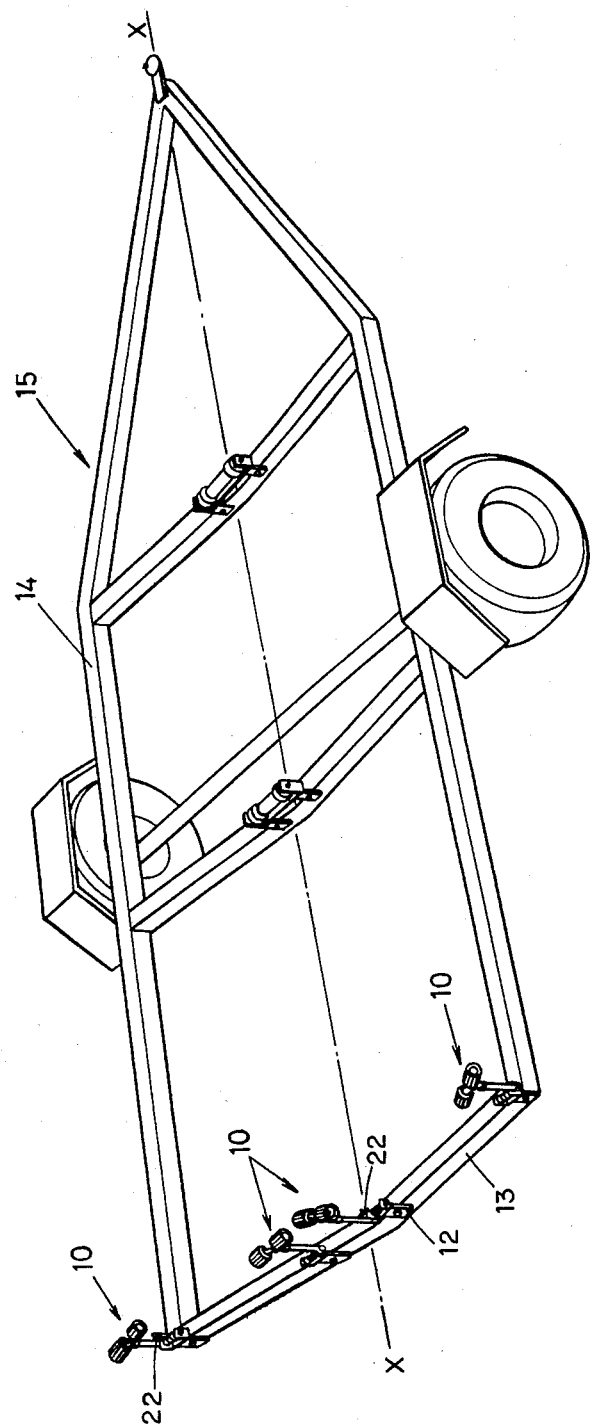

BOAT GUIDE ROLLER ASSEMBLY

This invention relates to a guide roller assembly which is useful for guiding a boat onto a boat trailer, and is specifically directed to improvements which will facilitate the alignment of the boat under adverse conditions.

BACKGROUND OF THE INVENTION

As is well known, one of the main problems encountered when a boat is to be retrieved from the water is the aligning of the boat with the rollers and pads of a boat trailer. Normally a boat trailer comprises a plurality of keel rollers which are set centrally, and which are generally of "cotton reel" shape. The rollers are flanked on each side usually by pads or by further rollers which bear against the base of the boat for supporting the boat for road travel.

Quite often retrieval is required to be effected when a boat is subjected to side wind pressures which may vary in intensity during retrieval, and also wave action which has the effect of raising and lowering the boat as an attempt is being made to retrieve it onto a boat trailer. These two effects combine to make retrieval quite difficult on windy days and the main object of this invention is to provide improvements whereby a boat is assisted considerably in being guided onto a boat trailer.

As a boat is retrieved, particularly on calm water, it is moved onto the trailer usually at a higher elevation than the elevation which is occupied when buoyant. This results in the bottom of the boat dragging over the side support pads (when used) and the boat may be scuffed, and the tension applied to the boat elements needs to be considerable to drag it over the pads, and this can result in further structural damage. Another object of the invention is to provide means whereby the loading of the boat over the pads is reduced.

BRIEF SUMMARY OF THE INVENTION

In this invention, a boat trailer has a pair of spaced guide roller assemblies between which the bow of a boat is located upon boat retrieval. Each guide roller assembly comprises a base member secured to the trailer chassis, a post which can pivot in a generally fore-and-aft direction, a spring which urges the post to an upstanding position, a rocker arm which can pivot in a general transverse direction on the upper end of the post, and a pair of rollers which engage the boat undersurface and help to centralise it as the boat is retrieved from the water and onto the trailer.

More specifically, a boat guide roller assembly consists of a base member of such size and shape as to be securable to the chassis of a boat trailer, a post, and post pivot means co-operable with the post and base member to guide the post for pivotal movement about a pivotal axis at the lower end of the post in a direction the major component of which is fore and aft, a rocker arm, and arm pivot means co-operable with the rocker arm and post to guide the rocker arm for pivotal movement about a pivotal axis between its ends and the upper end of the post in a direction the major component of which is transverse, a pair of rollers spaced from one another and carried on opposite ends of the rocker arm, and spring means co-acting with the base member and post urging the post to be upstanding from the base member.

Since the posts move in a general fore-and-aft direction, the rollers provide considerable resistance to side pressures imparted by wind and wave motion upon bow entry, where the rollers are engaged by high dead-rise surfaces.

As the boat is moved up onto a boat trailer, its dead rise angle reduces from the bow towards the stern, and as the posts pivot forwardly, the rollers take some of the loading of the boat and variation of dead rise angle is at least partly compensated for by transverse pivotal movement of the rocker arms. This is found to be particularly effective in assisting the guiding of the boat under conditions of high cross winds or adverse wave action. Forward movement of the pivoted posts is restrained by the helical torsion springs which impart an upward pressure against the rollers and thereby at least partly lift the boat, reducing the drag by a corresponding amount on the side pads. Although the posts pivot in a general fore-and-aft direction, and the rocker arms in a general transverse direction, some benefit can be obtained if the respective pivotal axes are not exactly transverse and longitudinal, respectively.

DETAILED DESCRIPTION OF THE DRAWINGS

An embodiment of the invention is described hereunder in some detail with reference to, and is illustrated in, the accompanying drawings, in which:

FIG. 1 is a perspective view of a boat trailer,

Figure 4:
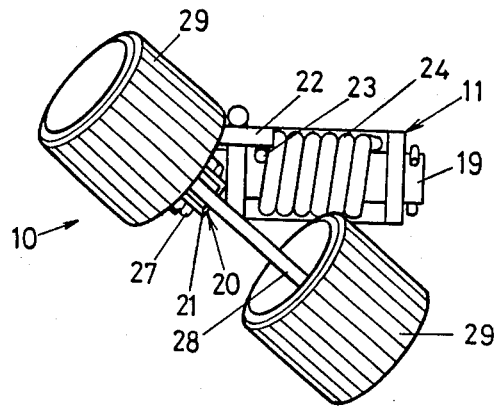
FIG. 4 is a plan.
Figure 2:
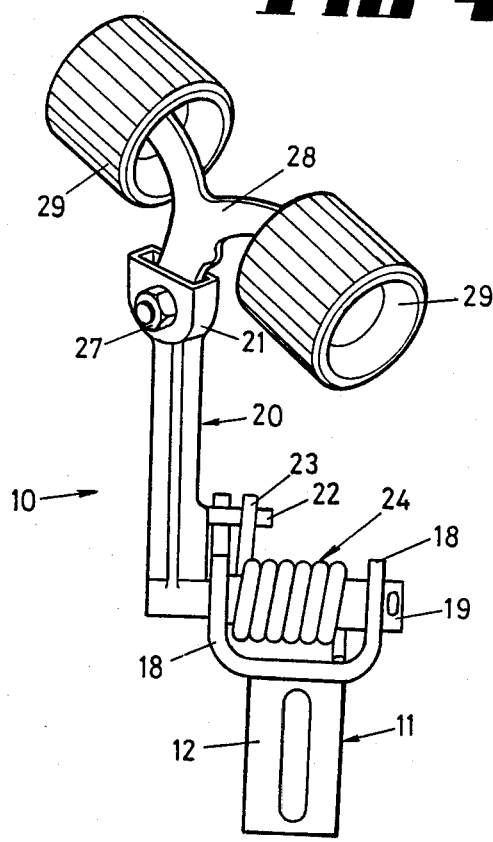
FIG. 2 is a front elevation of guide roller assembly.
Figure 3:
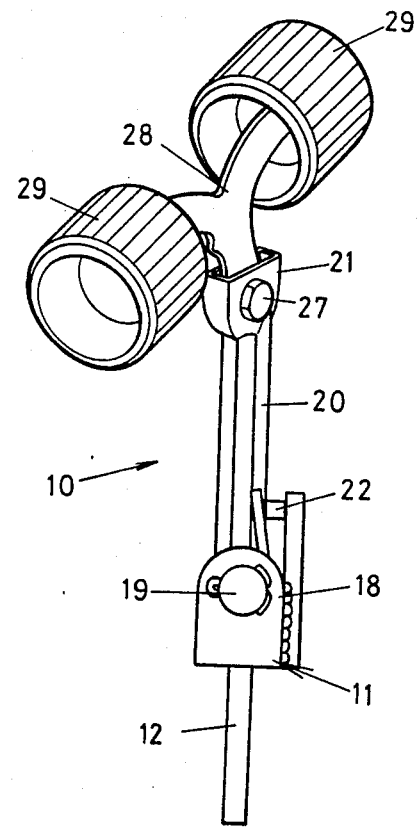
FIG. 3 is a side elevation of FIG. 2.

In this embodiment a boat guide roller assembly 10 comprises a base member 11 having a securing lug 12 depending downwardly from it by which it can be secured to the rear cross member 13 of a chassis 14 of a boat trailer 15. As illustrated, use is made of several guide roller assemblies 10 symmetrical with the central longitudinal axis X of the trailer, and in some instances, the roller assemblies 10 are spaced longitudinally along the length of the trailer 15.

The base member 11 includes a 'U' shaped bracket which terminates in two upwardly extending ends, 18. The upwardly extending ends carry a transversely extrending pivot pin 19 of a respective pivotted post, the pivotted post 20 having a hollow rectangular upper end 21, and also having a stop pin 22 extending from it which bears against an end leg 23 of a helical torsion spring 24 which extends transversely along portion of the length of the pivot pin 19. The other end of each helical torsion spring is retained by the rear edge of the base frame. By this arrangement, the pivoted post is normally retained vertical but can pivot forwardly against the torsion imparted by its helical torsion spring 24.

The upper end of each pivoted post is provided with a rocker arm pivot pin 27 which extends in a generally fore-and-aft direction, although the pivotal axis is oriented to have a minor transverse component of direction to provide a "lead-in" for a boat when being retrieved. Rocker arm movement is therefore mostly transverse, but has a minor fore-and-aft component. Pivot pin 27 pivotally supports a rocker arm 28 of "T" shape by engaging the lower end of the single limb of the rocker arm, the two other ends of the rocker arm carrying on them soft rubber rollers 29.

When a boat is to be lifted onto a trailer, the sloping surface of the forward end of the boat base firstly engages the inner rollers 29 of two adjacent roller assemblies, causing the rocker arms to pivot so that load is carried equally, or nearly equally, on the rollers of each rocker arm. As the boat progresses along the trailer upon retrieval, the rollers are depressed as the rocker arm position varies, so that the transverse portion thereof becomes more nearly horizontal (in conformity with the varying dead rise of the bottom of the boat). At the same time, the torsion springs 24 are twisted about their pivot pins 19, and impart an upward pressure to the boat through the rollers, and this is reflected in a largely reduced drag of a boat over the supporting pads, or the side rollers when they are used in lieu thereof.

Any tendency for the boat to twist from being aligned with the trailer will be resisted both by rollers 29 resisting lateral displacement, and by the torsion of that spring 24 which is subjected to the greater load and this has the effect of applying a moment to the boat which tends to correct its alignment. The upwardly urged rollers, in preventing the boat from misaligning, reduce the amount of force required to draw the boat over the side pads and the upward pressure adds to buoyancy in simplifying the final settling of the boat on the trailer.

In the above embodiment the roller arm and roller assembly has been described as comprising a "T" shaped arm, the central limb of which is pivotted to the upper end of the pivotted post. However there is some advantage in having four rollers, not two rollers on each side of the boat as shown (total of eight rollers instead of four), and in another embodiment of the invention not herein shown, the rocker arm although of general "T" shape, has two axles parallel with one another, each extending generally transversely, and each carrying the rollers so that the base of the boat has the upward force spread over a larger area. In order for the rollers to present themselves approximately in the correct aspect to the oncoming base of the boat, the pivotal mount for each respective rocker arm need not be central along the rocker arm but may be slightly to one side so that the rocker arms slope towards one another in a downward direction, i.e. they already occupy the final required position with respect to the base of the oncoming boat.

I claim:

1. A boat guide roller assembly comprising:
   a base member having a securing lug securable to the chassis of a boat trailer,
   a post, and post pivot means co-operable between the post and base member to guide the post for pivotal movement between a position where it is upstanding from the base member and where it is forward thereof, said movement being about a pivotal axis at the lower end of the post in a direction the major component of which is fore-and-aft,
   a rocker arm, and arm pivot means co-operable with the rocker arm and post to guide the rocker arm for pivotal movement about a pivotal axis between its ends and the upper end of the post in a direction the major component of which is transverse,
   a pair of rollers spaced from one another and carried on opposite ends of the rocker arm, and
   spring means co-acting with the base member and post urging the post to be upstanding from the base member, but being deflected upon downward pivotal movement of the post by a boat upon retrieval thereof thereby imparting upward pressure to the boat.

2. A boat guide roller assembly according to claim 1 wherein said base member comprises a 'U' shaped bracket terminating in two upwardly extending ends, said securing lug depending from the 'U' shaped bracket, said post pivot means comprising a pivot pin extending horizontally from the lower end of the post and carried by said upwardly extending ends, and said spring means comprising a torsion spring which surrounds said pivot pin, and has one end abutting a surface on the post and the other abutting a surface on the 'U' shaped bracket.

3. A boat guide roller assembly according to claim 1 wherein said post has an upper free end carrying said rocker arm, said arm pivot means comprises a horizontal pivot pin on the post upper end, the pivot pin carrying the rocker arm for pivotal movement in a direction a minor component of which is fore-and-aft.

4. A boat guide roller assembly according to claim 1 wherein said rollers are of soft elastomeric material, and one roller of each pair is lower than the other when the post is upstanding.

5. A boat trailer comprising a wheel-supported frame having a pair of boat guide roller assemblies thereon arranged symmetrically on opposite sides of the central longitudinal axis of the trailer, each boat guide roller assembly comprising:
   a base member comprising a securing lug securable to the chassis of a boat trailer,
   a post, and post pivot means co-operable between the post and base member to guide the post for pivotal movement between a position where it is upstanding from the base member and where it is forward thereof, said movement being about a pivotal axis at the lower end of the post in a direction the major component of which is fore-and-aft,
   a rocker arm, and arm pivot means co-operable with the rocker arm and post to guide the rocker arm for pivotal movement about a pivotal axis between its ends and the upper end of the post in a direction the major component of which is transverse,
   a pair of rollers spaced from one another and carried on opposite ends of the rocker arm, and
   spring means co-acting with the base member and post urging the post to be upstanding from the base member, but being deflected upon downward pivotal movement of the post by a boat upon retrieval thereof thereby imparting upward pressure to the boat.

6. A boat guide roller assembly comprising:
   a base member having a downwardly depending securing lug for securing the base member to the chassis of a boat trailer;
   a post having a lower end pivotally secured to the base member and an upper end projecting upwardly from the base member;
   pivot means for pivotally securing the lower end of the post to the base member for pivotal movement about a pivot axis transverse to the lower end of the post and in a generally fore-and-aft direction relative to the boat trailer;
   a rocker arm mounted at the upper end of the post to extend transverse to the post, and arm pivot means for pivotally mounting the rocker arm on the post for pivotal movement about a pivot axis transverse to the rocker arm in a direction the major component of which is transverse to the fore-and-aft direction;
   a pair of rollers carried on opposite ends of the rocker arm; and
   spring means acting between the base member and post for urging the post into an upright position projecting upwardly from the base member and boat trailer.

* * * * *